Sept. 20, 1971  E. C. HEWITT ET AL  3,605,539
APPARATUS FOR USE WITH CUTTING DEVICES FOR
ELONGATE WORKPIECES
Filed May 19, 1969

United States Patent Office

3,605,539
Patented Sept. 20, 1971

3,605,539
APPARATUS FOR USE WITH CUTTING DEVICES FOR ELONGATE WORKPIECES
Ewan Christian Hewitt and William James Richmond, Sheffield, England, assignors to Davey and United Engineering Company Limited, Sheffield, England
Filed May 19, 1969, Ser. No. 825,509
Claims priority, application Great Britain, May 21, 1968, 24,106/68
Int. Cl. B26d 5/20
U.S. Cl. 83—278
12 Claims

ABSTRACT OF THE DISCLOSURE

Apparatus for measuring off lengths of metal to be cut from a metal slab or bloom by a shear. The apparatus which is arranged wholly on the entry side of the shear includes a roller table for supporting a workpiece to be sheared, a pusher member engageable with the tail end of the workpiece and which is capable of displacing the workpiece under control towards the shear and an indicator means operatively coupled to the pusher member for indicating the precise position of the pusher member relative to the shear. A weighing apparatus may be provided to ascertain the weight of the workpiece so that the weight per unit length of the workpiece can be calculated.

---

Figure 1:
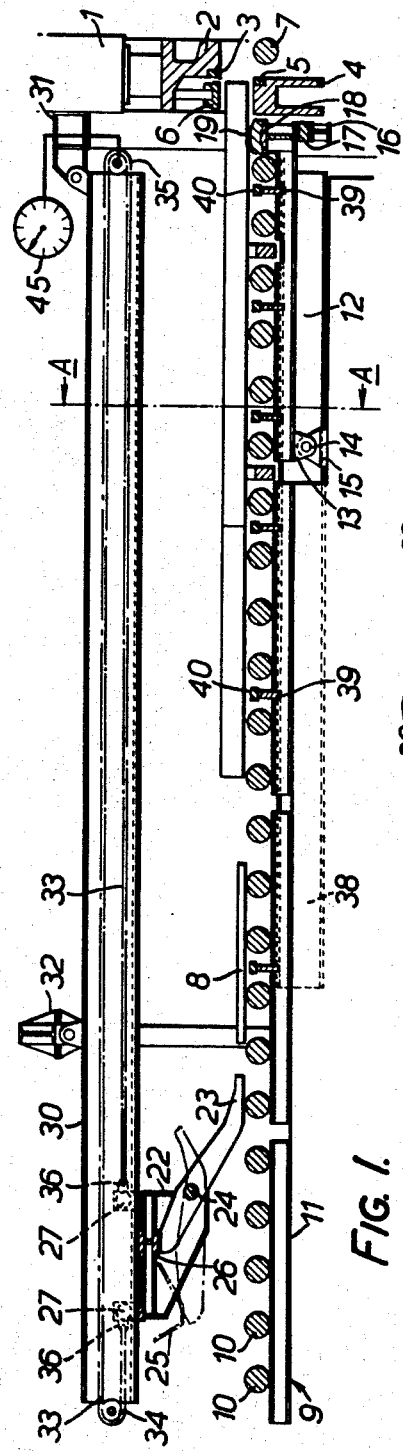

This invention relates to apparatus suitable for use with a device for cutting an elongate workpiece for example, a metal slab or bloom transverse to its length.

The apparatus in accordance with this invention is suitable for use with any type of device for cutting an elongate workpiece transverse to its length but for the purpose of this specification the apparatus will only be described in conjunction with a fixed shear having a static bottom blade and a moving top blade employed to give a down cutting action.

On existing shears for the cutting of metal blooms or slabs, equipment usually associated with the shear comprises driven roller tables on the ingoing and the outgoing sides of the shear. It is usual with such shears to provide measuring equipment on the outgoing side of the shear to enable the length of the section to be cut off of the leading end of the workpiece to be established and measured. In its simplest form this measuring equipment comprises a simple graduated scale and the leading end of the workpiece can be aligned with a selected division on the scale by suitable control of the drive of one or both of the roller tables. In a more sophisticated form, some of pointer or indicator can be preset an appropriate distance from the shear on the outgoing side thereof and the leading end of the slab or bloom is similarly aligned with the pointer or indicator by controlling the drive of one or both of the roller tables. Both of these arrangements suffer from the disadvantage that the workpiece must be advanced relatively slowly if the leading end is to be aligned accurately with the pointer or scale and also some means must be found to avoid the possibility of parallax errors.

It is also known to provide on the outgoing side of a shear some form of apparatus comprising a carriage which can be displaced an appropriate distance from the shear and including a stop which can be positioned so that it will arrest the slab or bloom in the appropriate position ready for shearing or it may be moved clear of the roller table to allow the cut section to proceed along the table for subsequent weighing, marking, cooling or piling. The apparatus may either be arranged to straddle the roller table on the outgoing side of the shear or it may be cantilevered from supports mounted at one side of the table. Both of these arrangements suffer from the disadvantage that due to high impact loads which can result from the workpiece engaging the stop, the apparatus has to be relatively massive and this impedes access to the roller table for maintenance purposes and it also restricts visibility of the workpiece on the outgoing side of the shear. It is also known for the apparatus to include strong springs in the stop or in the supporting structure to cushion the impact load between the stop and the workpiece but the use of such springs result in the further disadvantage that unless care is taken by the operator, the workpiece will be sheared with the springs partially compressed, thereby producing a cut section which is longer than the desired length.

It is an object of the present invention to provide apparatus suitable for use with a device for cutting an elongate workpiece transverse to its length in which the disadvantages referred to above in known arrangements are at least partially overcome.

According to a first aspect of the present invention there is provided an apparatus suitable for use with a device for cutting an elongate workpiece transverse to its length, comprising means engageable with the workpiece whilst on the entry side of the cutting device to displace the workpiece under control along a path in a direction parallel to its longitudinal axis towards the cutting device and indicator means responsive to said engageable means for indicating the extent of the displacement of the workpiece.

According to a second aspect of the invention there is provided the combination of a device for cutting an elongate metal workpiece transverse to its length, support means for supporting the workpiece on the entry side of the cutting device, and apparatus comprising means engageable with the workpiece whilst supported on said support means to displace the workpiece under control along a path in a direction parallel to its longitudinal axis towards the cutting device and indicator means responsive to said engageable means for indicating the extent of the displacement of the workpiece.

Preferably the means engageable with the workpiece comprises a pusher adapted to engage the rear end of the workpiece and itself displaceable towards and away from the cutting device in a direction parallel to the longitudinal axis of the workpiece. The displacement of the pusher in the direction parallel to the longitudinal axis of the workpiece is indicated on a visual indicator unit of said indicator means and since the workpiece is displaced under control by the pusher unit the indicator means show with accuracy the position of the workpiece relative to the cutting device. In various embodiments of the invention, the pusher for displacing the workpiece under control towards the cutting device may comprise a pushing head or finger which protrudes between the two halves of a split or double roller table on the entry side of the shear or the pusher may be straddle mounted over the ingoing roller table or cantilevered from one or both sides of the ingoing roller table. In all these embodiments of the invention, because the apparatus for displacing the workpiece is on the entry side of the shear, this apparatus does not prevent access to the outgoing roller table for maintenance purposes nor does it impair the operator's view of the end of the workpiece when positioned on the outgoing roller table.

Figure 2:
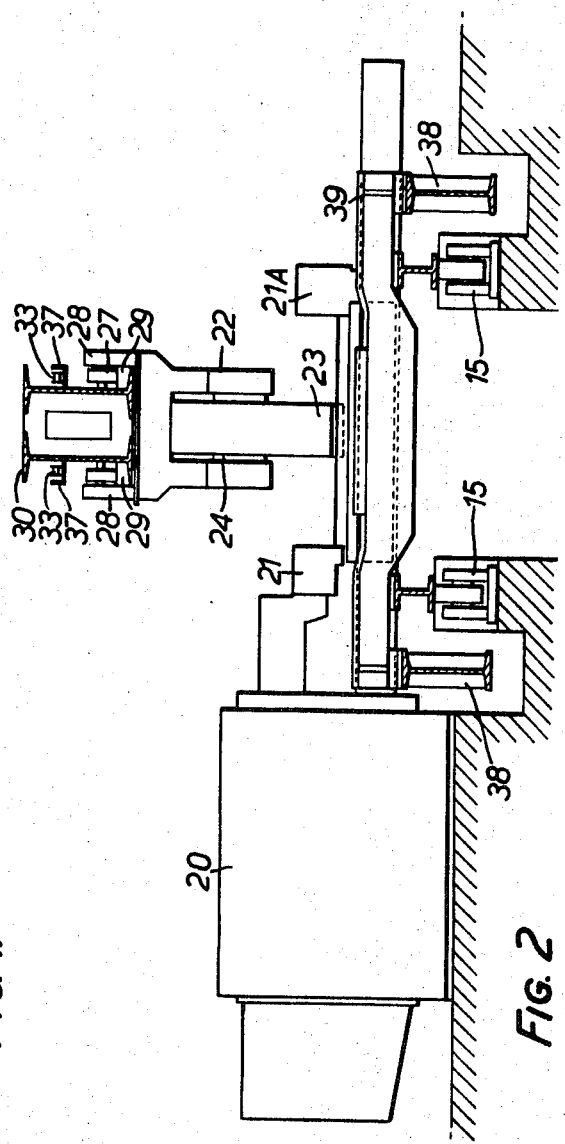

An embodiment of the invention will now be described, by way of example only, with reference to the accompanying drawings, in which:

FIG. 1 shows a longitudinal section through a down-cutting slab shear and the equipment on the ingoing side of that shear, and FIG. 2 shows a cross-section through the equipment shown in FIG. 1 along the line A—A.

With reference to these figures, a shear 1 comprises a top moving bolster 2 containing a shear blade 3 and a lower fixed bolster 4 containing a shear blade 5. The shear includes a gag 6 designed to hold the piece being sheared down onto the bottom bolster 4 during the shearing action. A depressing table is provided on the outgoing side of the shear only one roller 7 of which is illustrated in FIG. 1.

A workpiece 8 to be cut is conveyed to the shear along a roller table 9 comprising a number of rollers 10 carried in suitable bearings and pedestals (not shown). Some of these rollers 10 with their bearings and pedestals are mounted on substructures 11 but the six rollers closest to the shear are mounted upon a separate substructure 12 having at the end remote from the shear a number of brackets 13 attached to its underside and connected together by shafts 14 carried in bearings (not shown) in foundation mounted pedestals 15 such that the whole table and its structure can pivot about the axis of the shafts 14. At the end of the substructure 12 adjacent to the shear is provided a suitably mounted support member 16 upon the top of which is secured a suitable resilient material 17 and upon which the end of the substructure 12 rests. The substructure carries an extension piece 18 upon which a braking block 19 is mounted such as to resist any force applied to it in the direction towards or away from the shear but such that the braking block may be readily removed or replaced if required. This braking block is of such a size that it is normally proud of the top of the table rollers so that the workpiece 8 upon approaching the shear along the roller table must ride up onto the top surface of the braking block. The workpiece is located centrally of the roller table 9 with its axis parallel to the axis of the roller table by means of adjustable sideguides 20 having heads 21 and 21A which may be brought to bear against the sides of the workpiece.

A pusher and measuring apparatus is mounted over the ingoing roller table 9 and comprises a pusher frame or carriage 22 carrying a pusher head 23 pivoted upon a shaft 24 mounted in the frame and arranged so that the pusher head 23 is normally in the position indicated in full lines in FIG. 1 but such that at the end of the pusher stroke, the head is raised to the position indicated in dotted lines by means of a cam roller (not shown) and a cam 25. In the operating position, any reaction against the pusher head 23 is transmitted by the upper end of the pusher head to a specially strengthened portion 26 of the carriage 22.

The carriage 22 is supported upon four wheels 27, one at each corner of the carriage and mounted upon brackets 28 upwardly extending from the carriage 22. The wheels are mounted in bearings on stub axles mounted in the brackets and the wheels run upon tracks 29 carried upon an overhead structure 30. This structure is suspended over the centreline of the ingoing table by means of one support 31 adjacent to the shear and a further support mounted on a bridge structure 32 spanning the roller table towards the rear of the support beam 30 and carried on two piers one on each side of the roller table.

The pusher carriage is propelled along its track by means of two chains 33, one on either side of the carriage, each chain passing round a tail sprocket 34, suitably mounted to maintain tension in the chain and a drive sprocket 35 mounted at the shear end of the support beam and arranged to be driven through an electrically driven reduction gear unit (not shown). The chain is attached to the front and rear of the carriage 22 by suitable anchor points 36, the part of the chains above the carriage 22 being supported upon tracks 37 mounted upon the support beam 30. An indicator means for monitoring the position of the pusher head 23 is provided. The indicator means may take any one of a number of types, for instance it may comprise a selsyn transmitter operatively coupled either to the drive sprocket 35 or to the reduction gear unit and a selsyn receiver and a visual indicator unit, i.e. a pointer and a graduated scale, shown schematically at 45 in FIG. 1. In a more complex form the position of the pusher head 23 may be determined a series of digital position control units (not shown) which operate in conjunction with automatic equipment (not shown) to control both the position and displacement of the pusher head 23.

The pusher unit and ingoing table operate in conjunction with a weighing mechanism comprising two weighing beams 38 longitudinally disposed on either side of the roller table and arranged to support a number of cross members 39 having support fingers 40 located between and normally in ambush below the tops of the table rollers 10. The weighing beams 38 are arranged so that they are supported at two points along their length by means of lifting equipment incorporating appropriate strain gauge loadcells which enable the equipment to measure the weight of the piece together with the weight of the weighing beams and associated cross beams and lifting fingers.

It will be evident from a study of the drawings together with the foregoing description that the pusher head 23 can, by means of the chain drive and driving sprocket 35, be positioned with the head 23 bearing against the rear of the workpiece to be sheared 8 and that by actuating the pusher drive the workpiece may be propelled whilst remaining in contact with the pusher head, and therefore under control, towards the shear. The workpiece 8 is held square on the roller table by means of the side guide heads 21 and 21A and rides partly upon the table rollers 10 and partly upon the braking block 19. If desired the drives for the roller table may be used to assist the pusher head in displacing the workpiece towards the shear or they may be used in retarding the displacement of the workpiece.

In operation the workpiece 8 is conveyed to the shear along the roller table 9. The carriage 22 is at its extreme left-hand position in FIG. 1. The pusher head 23 is raised to allow the workpiece 8 to pass beneath it after which it is lowered and advanced until it bears against the end of the workpiece and pushes the workpiece towards the shear. When the workpiece has been positioned for the first cut, the shear gag 6 is actuated to hold the workpiece 8 firmly upon the lower shear bolster 4 whilst the top shear bolster 2 descends permitting the shear knives 3 and 4 to perform the shearing action in conjunction with the depressing action of the pull-back and depressing table 7. The action of the shear gag 6 in forcing the workpiece down upon the roller table is to pivot the section of roller table 12 about the pivot shafts 14 and thereby depress the table rollers and the braking block 19 to a point level with or below the top of the shear bolster 4, the resilient material 17 being compressed to accommodate the required movement.

Following each shearing stroke, the top bolster and shear gag return to the positions illustrated in FIG. 1 and the pusher can advance the workpiece 8 to permit a further front discard or a selected length of piece to be positioned beyond the shear ready for the next cut. When the shear operator has decided that sufficient front end crop cuts have been taken, he can quickly establish by means of the indicator means the total remaining length of the workpiece from the indication of the position of the pusher head 23. With this information the shear operator can then obtain an estimate of the available length of sound material in the workpiece by applying a correction factor to take into account the length of unsound material between the pusher head and the rearmost piece of sound material. This correction factor can be applied in a number of different ways such as by direct physical measurement or by visual estimation directly or via closed-circuit television or by statistical data based upon previous experience or alternatively by a combination of these methods. From this knowledge of the available length of sound material in the workpiece, the shear operator can then, if shearing is to be based upon sections of predetermined length, select a suitable combination of required lengths which do not exceed the estimated available length of the workpiece but which result in the minimum of waste material after the sections have been cut.

When it is required to sub-divide the workpiece into sections of predetermined weight rather than of predetermined length the operator can raise the weighing beams 38 and by means of the fingers 40 raise the workpiece clear of the roller table in order to determine the total weight excluding the front end crops. By means of the indicator means responsive to displacement of the pusher head 23 or similar displacing means, the length of the workpiece after the front end crops have been taken is known so that the average weight per foot of the workpiece can readily be calculated, neglecting the errors due to the irregularity in the shape or density of the back end of the workpiece. A correction factor for the shape and density of the back end discard may be applied, this factor being obtained by any of the methods described above for establishing a similar factor for the length of unsound material. The average weight per foot to be used for shearing calculations is obtained by the following formula $$\frac{Kw \times Wt}{K_1 \times Lt}$$

where $Wt$ is the total weight of the workpiece after the front end has been cropped, $Kw$ is the factor to be applied for obtaining the weight of sound material, $Lt$ is the total measured length after the front end has been cropped and $Kl$ is the correction factor used to obtain the estimated length of sound material. In practice $Kw$ and $Kl$ are both less than unity. Once the average weight per foot has been calculated the pusher unit can be advanced the necessary amount for the production of a piece of appropriate length or weight.

In a further non-illustrated embodiment of the invention, the side guides are mounted so as to be movable towards or away from the shear in a direction parallel to the centre line of the roller table on the ingoing side of the shear, and the side guides act as the means for engaging the workpiece and displacing it towards the shear. In this embodiment of the invention therefore the side guides serve to align the workpiece, displace the workpiece towards the shear and also provide a retarding effect on the workpiece. Alternatively the side guides need not engage with the workpiece and need not be moved towards or away from the shear but this function may be provided by means of suitable traction units mounted on the side guides such as a series of driven rollers or moving chains. These units may bear upon the lower face, the sides or the upper face of the workpiece as is most convenient.

What is claimed is:

1. Apparatus suitable for use with a device for cutting an elongate workpiece transverse to its length, comprising a roller table for supporting the workpiece on the entry side of the cutting device, the roller table comprising a plurality of driven rollers each extending normal to the length of the table, and mounted in groups on separate substructures, the substructure supporting the group of rollers adjacent the cutting device being pivotable in the vertical plane about the end of the substructure away from the cutting device, an upstanding extension piece on the end of said substructure adjacent the cutting device, a brake block on said extension piece and resilient means supporting the end of said structure adjacent the cutting device with the brake block projecting above said rollers and permitting the brake block to be displaced by a workpiece into ambush below the level of said rollers, means engageable with the workpiece on the entry side of the cutting device to displace the workpiece under control along a path in a direction parallel to its longitudinal axis towards the cutting device and indicator means responsive to said engageable means for indicating the extent of the displacement of the workpiece.

2. Apparatus according to claim 1 in which the means engageable with the workpiece comprises a pusher adapted to engage the rear end of the workpiece, the pusher being displaceable in the direction parallel to the longitudinal axis of the workpiece.

3. Apparatus according to claim 2 in which the pusher comprises a pushing head straddle-mounted over the path of displacement of the workpiece.

4. Apparatus according to claim 3 in which the pushing head is pivotally mounted on a carriage, the carriage being suspended from and movable along a track supported above the path of displacement of the workpiece.

5. Apparatus as claimed in claim 1 and having sideguides for guiding the workpiece as it is displaced towards the cutting device.

6. Apparatus as claimed in claim 1 having a workpiece weighing mechanism located below the roller table, the weighing mechanism being movable vertically to lift the workpiece from the roller table in order to weigh it and to deposit it back on to the roller table after it has been weighed.

7. Apparatus as claimed in claim 1 having a workpiece weighing mechanism located below the roller table, the weighing mechanism being movably vertically to lift the workpiece from the roller table in order to weigh it and deposit it back on the roller table after it has been weighed.

8. Apparatus as claimed in claim 7 in which the weighing mechanism comprises two weighing beams longitudinally disposed on either side of the roller table and a number of cross members carried by the beams so that the members are located between and normally below the plane of the rollers, each weighing beam being supported at two points along its length by means of lifting equipment incorporating strain gauge loadcells.

9. The combination according to claim 8 having sideguides comprising heads arranged one on each side of and coextensive with at least a part of the roller table adjacent the cutting device.

10. Apparatus as claimed in claim 4 in which the carriage is movable along the track by means of a pair of chains attached to one side of the carriage and passing over idler sprockets located at one end of the track and over drivable sprockets located at the other end of the track and attached to the other side of the carriage.

11. Apparatus as claimed in claim 10 in which the indicator means comprises a selsyn transmitter operatively coupled to the drivable sprockets, a selsyn receiver and a visual indicator unit.

12. The combination of a device for cutting an elongate metal workpiece transverse to its length and apparatus as claimed in claim 1.

References Cited

UNITED STATES PATENTS

| 3,175,438 | 8/1962 | Johnson | 83—77X |
| 3,411,389 | 4/1966 | Wiese | 83—210X |
| 3,513,741 | 11/1967 | Shallenberg | 83—210X |

FOREIGN PATENTS

| 1,064,707 | 1967 | Great Britain. |

ANDREW R. JUHASZ, Primary Examiner

J. F. COAN, Assistant Examiner

U.S. Cl. X.R.

83—401, 522